United States Patent [19]

Sawicki et al.

[11] Patent Number: 5,250,193
[45] Date of Patent: Oct. 5, 1993

[54] WET OXIDATION OF AQUEOUS STREAMS

[75] Inventors: John E. Sawicki, Breinigsville; Baldomero Casas, Emmaus, both of Pa.; Chiung-Yuan Huang, Glen Ridge, N.J.; William R. Killilea, West Chelmsford; Glenn T. Hong, Tewksbury, both of Mass.

[73] Assignee: Air Products and Chemicals, Inc., Allentown, Pa.

[21] Appl. No.: 921,190

[22] Filed: Jul. 28, 1992

[51] Int. Cl.$^5$ .............................................. C02F 1/72
[52] U.S. Cl. ................................... 210/761; 210/908; 210/909; 210/758
[58] Field of Search ............... 210/758, 761, 762, 909, 210/908

[56] References Cited

U.S. PATENT DOCUMENTS

| | | | |
|---|---|---|---|
| 3,920,506 | 11/1975 | Morgan | 210/761 |
| 4,113,446 | 9/1978 | Modell et al. | 48/202 |
| 4,141,829 | 2/1979 | Thiel et al. | 210/63 R |
| 4,145,283 | 3/1979 | Topp et al. | 210/63 R |
| 4,347,144 | 8/1982 | Bodenbenner et al. | 210/761 |
| 4,543,190 | 9/1985 | Modell | 210/721 |
| 4,853,136 | 8/1989 | Roussel et al. | 210/761 |
| 5,106,513 | 4/1992 | Hong | 210/761 |

Primary Examiner—Stanley S. Silverman
Assistant Examiner—Cynthia L. Nessler
Attorney, Agent, or Firm—Russell L. Brewer; James C. Simmons; William F. Marsh

[57] ABSTRACT

This invention relates to improved wet oxidation process for the destruction of organic components in a wastewater stream contaminated with inorganic salts. In wet oxidation, the wastewater stream is contacted with an oxygen-containing water stream at elevated temperatures and pressures. The improvement for treating aqueous wastewater streams contaminated with inorganic salts wherein the organic contaminants are present in an amount from about 0.5 to 2% by weight resides in oxidizing the organic components in a tubular reactor at a temperature ranging from 325° C. to not more than 370° C. and a pressure ranging from 220 to 345 bar. The oxidation reaction is carried out in a reaction time of 5 minutes or less.

5 Claims, No Drawings

WET OXIDATION OF AQUEOUS STREAMS

TECHNICAL FIELD

This invention relates to an improved process for the reduction of organic compounds in a waste stream by wet oxidation.

BACKGROUND OF THE INVENTION

In chemical process industries effluent streams containing various levels of organic byproducts are generated which must be purified or treated prior to their discharge to the environment. Technology which is referred to as wet oxidation, is finding new applications for the destruction of organic material in these effluent streams. Traditionally, wet oxidation involves the contacting of organic compounds dispersed in an aqueous medium with an oxygen-containing substance at elevated temperatures and pressures wherein the organic compounds are converted to carbon dioxide and water. Representative patents which show the wet oxidation of organic substances in aqueous mediums at elevated temperatures are as follows:

U.S. Pat. No. 4,141,829 discloses a process for the oxidation of organic substances which are dissolved or dispersed in an aqueous stream utilizing molecular oxygen as the oxidant. Combustion of the organic components is carried out in a two phase system under liquid phase conditions. To maintain liquid phase conditions, the pressure in the reaction zone is adjusted such that it is higher than the vapor pressure of water, e.g., 1 to about 1.3 times the partial pressure of steam. To avoid precipitation of salts, if salts are present in the stream, the reaction is carried out at a pressure sufficient to prevent substantial evaporation of the water. Temperatures for wet oxidation of the waste range from 150° to 370° C. and pressures range from 5 to 235 bars.

U.S. Pat. No. 4,543,190 discloses a method for oxidizing organic materials by wet oxidation wherein oxidation is effected in a reaction zone maintained at a temperature above the critical temperature for water (374° C.) and at a pressure of at least 220 atmospheres. Destruction of organic material in streams having from 2 to 25%, by weight organic material is accomplished.

U.S. Pat. No. 4,113,446 discloses a wet oxidation process for converting solid and liquid organic materials to high BTU gas with little tar formation. The reaction is carried out at a temperature and pressure equal to or exceeding the critical temperature and pressure for water. When the solid or liquid organic material is intimately mixed with the water at temperatures above the critical temperature of water (647° K.) and above the critical pressure (218 atmospheres) reforming occurs rapidly and product gas is obtained from the reaction zone at high pressure.

U.S. Pat. No. 4,145,283 discloses a process for the purification of a wastewater stream containing organic by-products from the synthesis of hydroxy aromatics by means of a caustic soda melt. The organics are oxidized at temperatures of 100°-370° C. at pressures of from 1-300 bars.

U.S. Pat. No. 4,853,136 discloses a process for oxidizing organic material in a polyphase tubular reactor at temperature conditions of 50°-370° C. and below the critical temperature and a pressure below the critical pressure from 2-210 bars. A plurality of injections are made in the polyphase tubular reactor.

To summarize the prior art, wet oxidation of organic contaminants in waste streams at elevated temperature and pressure is rather common and can be accomplished without substantial difficulty. Difficulties arise, however, in the treatment of waste streams containing substantial levels of inorganic components or salts. Other difficulties also exist in the treatment of organic contaminants containing inorganic salts in tubular reactors.

SUMMARY OF THE INVENTION

This invention relates to an improved wet air oxidation process for the combustion of organic compounds in a waste stream contaminated with inorganic salts. The process is advantageous for effecting combustion of a variety of organic materials in a wastewater stream containing virtually any of those organic materials, including difficult-to-oxidize organic by-products, generated by a chemical process industry. The process is particularly advantageous for the destruction of organic by-products generated in the manufacture of nitroaromatics and the hydrogenated derivatives thereof. These by-products include nitrophenolic materials such as nitrocresols and aromatic amines such as aniline and toluenediamine. Typically, the level of organic material in these streams will range from about 0.5 to 2%, by weight.

The basic processes of the prior art, and utilized herein, comprise intimately contacting a waste stream with a source of molecular oxygen at elevated temperature and pressure for a time sufficient to oxidize the organic compounds. The improvement over the basic process for enhanced continuous oxidation at substantially reduced reaction time is achieved by oxidizing the organic components in said waste stream at a temperature of at least 325° C., but not above 370° C. and a pressure greater than the critical pressure, e.g., 220 to 345 bars in a tubular reactor. The conditions are consistant with single phase operation, that is, no gas phase exists in the system. The pressure is sufficiently high to keep both the oxygen and product gases in solution and thus ensure that mass transfer limitations are minimized or eliminated. In addition these conditions simplify equipment design, especially in the heat transfer system of this process. Sufficient throughput is maintained such that the residence time is about 5 minutes or less.

There are several advantages associated with the improved invention as described, and these include:

an ability to operate in a continuous mode utilizing simple reactor equipment; e.g., a tubular reactor;

an ability to operate and effect substantial destruction of organic materials in a waste stream contaminated with inorganic salts without blockage of the tubular reactor;

an ability to rapidly handle waste streams containing low levels of organic materials contained therein; e.g., from 0.5 to about 2% by weight of organic materials;

an ability to effect rapid combustion of difficult-to-oxidize organic materials such as nitroaromatics and nitrophenolic to an extremely low level, e.g., less than about 0.01 ppm;

interfacial resistance and mass transfer are essentially eliminated and decomposition of the organic material occurs at the chemical kinetic rate, thus reducing oxidation times to 5 minutes and less; and enhanced safety through single phase operation and avoidance of an oxygen-rich vapor-volatile organic vapor phase present in the liquid, phase reaction, two phase systems employed heretofore.

DETAILED DESCRIPTION OF THE INVENTION

It has been found that high conversion of organic compounds in a wastewater stream contaminated with inorganic salts can be achieved on a continuous basis without plugging of the reactor at substantially reduced reaction times. In contrast to prior art single vapor phase processes effecting accelerated oxidation wherein supercritical conditions were utilized; e.g., the reaction was carried out at a temperature above the critical temperature, or to those two-phase processes used for effecting oxidation of organics at a temperature below the critical temperature and below the critical pressure of water, this wet oxidation process is better described as near critical wet oxidation. By "near critical wet oxidation", it is meant that the conditions for wet oxidation are selected such that the temperature is slightly below the critical temperature and the pressure is above the critical pressure. By operating under these conditions rapid oxidation of the organics can be achieved while maintaining the salts in solution. Near critical conditions also enhances the rate of destruction of organic materials because the gases are substantially soluble in the liquid phase under these conditions.

The reaction for effecting combustion or oxidation of organic materials in an aqueous wastewater stream is effected by intimately contacting the organic material with an oxygen-containing source, typically air or oxygen of elevated temperature. Prior to injecting the aqueous wastewater stream and air into the reactor, the waste stream is preheated and directly mixed with the air to minimize heat loss due to indirect heat exchange. Preheating should be sufficient to raise the temperature of the wastewater stream preferably to a level of about 340° to 360° C.; the pressure is raised to a level of 240 to 300 bars. Often water at above the critical temperature, obtained as an effluent from the reactor, is used as makeup and as a heat source for the wastewater stream and air. An advantage of preheating the wastewater and air fed to the reactor is that heat of reaction is not utilized to raise the temperature of the feed wastewater, thus oxidation can occur substantially instantaneously once injected into the reaction zone. If the temperature in the reaction zone exceeds the critical temperature of water, even for a short period of time, vapor phase conditions exist in the tubular reactor and certain inorganic salts presented in the aqueous feed may precipitate and effect blockage of the reactor. Thus, it is important to maintain the reaction temperature, including those zones where there is substantial heat generated through exothermic decomposition of the organic materials to a temperature slightly less than the critical temperature so that a single liquid phase system is maintained. The process is particularly adapted for effecting combustion of streams containing low concentrations, e.g., 1-2% of organic materials. Often, in the destruction of waste streams containing dilute levels of organic materials, insufficient heat may be generated by the exothermic oxidation of such organic materials to maintain temperature and additional fuel material may be introduced into the waste stream to maintain temperature. Typically these carbon sources include low grade fuels.

The reaction time for effecting oxidation of the organic components is dependent upon the degree of oxidation required and indirectly on salt concentration. To effect substantially complete oxidation, e.g., at least 80% or more of the organics in the wastewater being decomposed into water and carbon dioxide, a reaction time of two minutes or less may be used. Shorter, reaction times also allow for enhanced flow through the reactor and lesser quantities of salt precipitate. Reaction times may reach five minutes, but when utilizing the conditions specified, reaction times typically do not exceed two minutes. Although oxidation of the organic materials can be achieved in shorter reaction times at temperatures above the critical temperatures, such conditions do not generally permit the processing of wastewater streams containing salts in a tubular reactor because the salts frequently precipitate and plug the reactor not to mention the fact that heat transfer in the two phase system is poor.

Although not intending to be bound by theory, it appears that by operating at near critical wet oxidation conditions, the advantage of essentially single phase processing permits oxidation of organics with the elimination of mechanical agitation or mixing while the advantages of liquid-phase processing which permit retention of salts in solution, thereby minimizing plugging of the reaction zone are achieved.

The following examples are provided to illustrate various embodiments of the invention and are not intended to restrict the scope thereof.

EXAMPLE 1

A series of tests was performed to determine the ability of wet oxidation to oxidize a dilute wastewater stream obtained from a chemical industry associated with the production of a dinitrotoluene and toluenediamine. The reaction zone or reactor consisted of a 0.215 inch inside diameter coiled pipe reactor having a length of about 530 feet providing a volume of 3784 mL. The feed was introduced into the reactor at the top coil and the feed passed downwardly and out the bottom coil. The wastewater feed used for testing in the wet oxidation process contained toluene, mononitrotoluene, dinitrotoluene, as well as hard to oxidize pollutants such as phenol, including 2- and 4-nitrophenol, 2,4-dinitrophenol, nitroorthocresols including di- and trinitroorthocresols and nitrobenzene. The total level of organic contaminants in the aqueous waste stream was less than about 2% by weight.

In conducting the tests, the wastewater feed was passed through a regenerative heat exchanger wherein the feed was heated to a temperature of about 250° C. Oxygen was used as the oxidizing source for the wet oxidation process. It was mixed with makeup water at substantially critical temperature and then directly mixed with the wastewater feed exiting the regenerative heat exchanger. Mixing of the water at the critical temperature and oxygen with the waste feed was effected in a "cyclone" injector, wherein the waste feed was introduced tangentially and the water/oxygen entered axially to the injector. The resulting mixture exited axially from the injector and was then introduced to the reactor zone. The use of a cyclone injector was believed to minimize high injector wall temperatures and minimize salt precipitation which might have thus occurred at the wall.

Table 1 sets forth reactor conditions for a series of runs carried out in the tubular reactor.

TABLE 1

Testing Run Conditions

| | Run No. | | | | | | |
|---|---|---|---|---|---|---|---|
| | 1 | 2 | 3 | 4 | 5 | 6 | 7 |
| System Flow Rates (mL/min) | | | | | | | |
| Waste[1] | 383 | 387 | 380 | 374 | 374 | 379 | 401 |
| SCW[2] | 67 | 58 | 60 | 53 | 60 | 64 | 68 |
| Oxygen[3] | 8600 | 2600 | 1200 | 1100 | 1900 | 1800 | 1400 |
| Effluent[4] | 450 | 445 | 440 | 427 | 434 | 443 | 469 |
| Calculated Conditions | | | | | | | |
| lb $O_2$/lb Waste | .029 | .009 | .004 | .004 | .007 | .006 | .005 |
| $O_2$ Stoich %[5] | 717 | 215 | 101 | 94 | 162 | 152 | 111 |
| Liquid Dilution Factor[6] | 1.2 | 1.1 | 1.2 | 1.1 | 1.2 | 1.2 | 1.2 |
| Residence Time (min) | 5.3 | 5.4 | 5.5 | 5.5 | 5.6 | 2.2 | 2.0 |
| Pressure (psig) | 3450 | 3450 | 3450 | 3450 | 3450 | 3450 | 3450 |
| System Temperature (°C.) | | | | | | | |
| Reactor Avg[7] | 340 | 342 | 342 | 349 | 343 | 338 | 352 |

[1] Calculated by difference of effluent and SCW rates.
[2] Calculated from long-term level drop in feed tank.
[3] Gas flow rate is given in normal mL/min.
[4] Direct effluent measurement.
[5] Calculated assuming: about 3,000 ppm nitrophenolic by-product, 900 ppm from sodium acetate, no oxygen contributed from nitro groups or nitrates. 3.13 NLPM $O_2$/L feed = 100%.
[6] All subsequent liquid analyses have been corrected for dilution.
[7] Average of surface thermocouples (TCS) equally spaced along the coil; 16 TCs for the 5 min case and 7 TCs for the 2 min case.

Both gas and liquid effluents were analyzed for the presence of organic contaminants and inorganic constituents in the form of nitrophenolic material and other difficult-to-oxidize organic components. All other oxidizable organic contaminants were oxidized substantially completely. These results are set forth in Tables 2 and 3.

TABLE 2

% Destruction Efficiency Liquid Analysis Time 2 min.

| | Run | | | | | | |
|---|---|---|---|---|---|---|---|
| | 1 | 2 | 3 | 4* | 5 | 6 | 7 |
| TOC | 78 | 77 | 69 | | 65 | 91 | 90 |
| MNT | 75 | 87 | 89 | | 73 | 95 | 95 |
| DNT | 95 | 99.9 | 99.9 | | 99.9 | 99.5 | 99.9 |
| Phenol | 99.9 | 99.9 | 99.9 | | 99.9 | 99.9 | 99.9 |
| 2,4-DNP | 99.7 | 99.3 | −115 | | −28 | 40 | −12 |
| 4,6-DNOC | 99.9 | 99.9 | 99.9 | | 99.9 | 99.9 | 99.9 |

*5 minutes

The negative values in Table 2 result from the formation of 2,4-DNP during the oxidation reaction. This product is most likely an intermediate compound formed from the partial oxidation of the corresponding dinitrocresol.

TABLE 3

Liquid Analysis Time 5 Minutes

| | Run | | | | | | |
|---|---|---|---|---|---|---|---|
| | 1 | 2 | 3 | 4 | 5 | 6 | 7 |
| TOC | 78 | 77 | 69 | 92 | 65 | 91 | 90 |
| MNT | 75 | 87 | 89 | 99.80 | 73 | 95 | 95 |
| DNT | 95 | 99.9 | 99.9 | 99.99 | 99.9 | 99.5 | 99.9 |
| Phenol | 99.9 | 99.9 | 99.9 | 99.97 | 99.9 | 99.9 | 99.9 |
| 2,4-DNP | 99.7 | 99.3 | −115 | 99.62 | −28 | 40 | −12 |
| 4,6-DNOC | 99.9 | 99.9 | 99.9 | 99.94 | 99.9 | 99.9 | 99.9 |

DISCUSSION OF RESULTS

Liquid Analyses

The following discussion of the liquid effluent analysis, presented above in Tables 2 and 3, focuses primarily on the results of runs 2 and 5-7. This group contains two runs each of 2 minutes and 5 minutes residence time. The oxygen stoichiometry for these four runs ranged from 111% to 215%. The 5 minute runs had higher oxygen flow rates (215% for run 2 and 162% for run 5) than the 2 minute runs (152% for run 6 and 111% for run 7). Run 1 had an extremely high oxygen excess (717% of stoichiometry), run #3 had questionable oxygen flow rates and run #4 was the "busted" run.

The reduction of TOC is a function of residence time. Sixty percent, or more, of the TOC destruction occurs by 2 minutes residence time, after which the TOC level for the two 5 minute cases (runs 2 and 5) gradually approached 80% destruction in the effluent (roughly 300–400 ppm). Note that the effluent TOC values of the 2 minute cases (runs 6 and 7) are lower than both the 2 minute tap offs and the effluents of runs 2 and 5. Samples were taken along the reactor's length through specially designed sample valves. These devices permitted taking samples from the reactor at points which corresponded to 1, 2, 3 and 4 minute residence times. These are refered to as "Tap-Off" points because they were taken before the reactor's effluent. Because of the higher oxygen flow in the 5 minute cases, lower TOC would be expected than in the 2 minute cases. The average reactor temperature for the lowest oxygen case, run 7, was however, 10° C. higher than the other three runs.

In all runs, to a greater or less extent, the liquid effluent had a yellow color and an odor reminiscent of the feed. It now appears that the latter was due to nitrobenzene, which has a characteristic almond-like odor.

EXAMPLE 2

Operation at Temperatures Above 370° C.—Two Phase System

Several experiments were conducted to determine whether precipitation of inorganic material if a two phase system were generated in the reactor. In the first set of experiments, a vessel reactor (approx. 3" diameter and 24" high) was used to continuously oxidize wastewater from a nitroaromatic production facility at supercritical conditions. During the course of the tests in the supercritical regime: 4000 psi, 380°–390° C. (approx. 3 hours), pressure drop across the reactor increased. When the reactor was opened, a salt plug approximately 10" deep was found. The only reason complete blockage was not observed was because of a small opening (slot) approximately 1"×¼" which ran through the center of the plug. The salt was predominantly sodium carbonate with small amounts of sodium sulfate. The sodium carbonate was produced from the chemical combination of sodium ions and carbon dioxide, a combustion product. From this example it was concluded that processing hazards were present if a two phase system were generated in situ.

EXAMPLE 3

Reactor Plugging Tests at Temperatures Above the Critical Temperature

A series of wet oxidation tests were made in a tubular flow reactor specifically designed to test for flow pluggage. The reactor feed was essentially the same as in Example 1. The tube was approximately 6" in length and ¼" in inside diameter. Whenever temperatures exceeded 370° C., the reactor plugged within 30 seconds. On one occasion, the pressure drop across the plug was measured at 1200 psi. In addition it was noted that if the feed heater's temperature rose above 370° C., the salt would precipitate in the heater causing the heat transfer to suffer.

EXAMPLE 4

Reactor Plugging Tests at Pressures Below Critical Pressure

If the test as described in Example 3 is conducted at pressures below the critical pressure and the temperature is reduced to generate a two phase, vapor containing condition, reaction times and plugging of the tubular reactor greatly increase.

We claim:

1. In a process for the oxidation of organic components by wet oxidation wherein a stream containing organic contaminants is contacted with a source of molecular oxygen at elevated temperature and pressure for times sufficient to effect oxidation of said organic contaminants, the improvement for effecting enhanced continuous wet oxidation of wastewater streams containing organic contaminants and also contaminated with inorganic salts at substantially reduced reaction time which comprises:

contacting said wastewater stream therein with a source of molecular oxygen in a tubular reactor;

maintaining a temperature of at least 325° C. but not above 370° C. and a pressure ranging from 220 to 345 bar such that essentially a single phase reaction is maintained;

maintaining a residence time of 5 minutes or less, the residence time being sufficient to effect oxidation of at least 80% of the organic contaminants contained in said stream; and wherein the organic contaminants are present in said aqueous wastewater stream in an amount from about 0.5 to 2% by weight.

2. The process of claim 1 wherein the inorganic salts are present in an amount of from about 0.1 to 1.0% by weight and comprise alkali or alkaline earth metal containing salts.

3. The process of claim 1 wherein the reaction is carried out at a temperature of from 340° to 360° C.

4. The process of claim 3 wherein the reaction is carried out at pressure ranging from 240 to 300 bar.

5. The process of claim 4 wherein the organic contaminants present in said wastewater stream comprises nitrophenolic compounds.

* * * * *